(12) United States Patent
Iriuchijima (10) Patent No.: US 8,174,797 B2
(45) Date of Patent: May 8, 2012

(54) HEAD SUSPENSION AND METHOD OF MANUFACTURING HEAD SUSPENSION

(75) Inventor: Osamu Iriuchijima, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/039,689

(22) Filed: Mar. 3, 2011

(65) Prior Publication Data
US 2011/0216446 A1    Sep. 8, 2011

(30) Foreign Application Priority Data

Mar. 3, 2010   (JP) ................. P2010-047184

(51) Int. Cl.
G11B 21/24    (2006.01)
(52) U.S. Cl. .................................... 360/294.4
(58) Field of Classification Search ............... 360/294.4, 360/294.1, 99.08, 244.2, 244.7, 294.3, 236.5, 360/245.8, 244.8; 29/603.06
See application file for complete search history.

(56) References Cited

U.S. PATENT DOCUMENTS

| | | | | |
|---|---|---|---|---|
| 2010/0165515 | A1* | 7/2010 | Ando | 360/290 |
| 2010/0165516 | A1* | 7/2010 | Fuchino | 360/294.4 |
| 2010/0177445 | A1* | 7/2010 | Fuchino | 360/294 |
| 2010/0296201 | A1* | 11/2010 | Kashima | 360/294.4 |
| 2011/0051290 | A1* | 3/2011 | Inoue et al. | 360/244.2 |
| 2011/0141624 | A1* | 6/2011 | Fuchino et al. | 360/244.2 |
| 2011/0279929 | A1* | 11/2011 | Kin | 360/294.4 |

FOREIGN PATENT DOCUMENTS

JP    2002-184140    6/2002

* cited by examiner

Primary Examiner — Allen Cao
(74) Attorney, Agent, or Firm — Jordan and Hamburg LLP (57) ABSTRACT

A head suspension has a conductive base plate, a piezoelectric element, and a load beam. The piezoelectric element deforms in response to a voltage applied thereto, thereby moving the load beam relative to the base plate in a sway direction. The head suspension includes an actuator base integral with the base plate, an auxiliary plate laid on and fixed to the actuator base and having a surface support and a side support, the surface support facing a periphery of a surface of the piezoelectric element, the side support facing in the sway direction a side face of the piezoelectric element, an attaching part formed of the actuator base and auxiliary plate, the attaching part being present between the base plate and the load beam and being configured to attach the piezoelectric element thereto, a nonconductive adhesive layer interposed between the attaching part and the piezoelectric element, to adhere the piezoelectric element to the attaching part, and a conductive material configured to electrically connect an electrode plane of the piezoelectric element and the side support to each other. The head suspension is thin and secures conductivity between the electrode plane of the piezoelectric element and the actuator base.

10 Claims, 10 Drawing Sheets

HEAD SUSPENSION AND METHOD OF MANUFACTURING HEAD SUSPENSION

BACKGROUND OF THE INVENTION

1. Field of the Invention

The present invention relates to a head suspension having a piezoelectric element that deforms in response to a voltage applied thereto and a method of manufacturing the head suspension.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

To meet the need for micro-actuators for magnetic disk drives, Japanese Unexamined Patent Application Publication No. 2002-184140 has proposed a head suspension for a disk drive. The head suspension includes a base plate, a hinge to form an actuator base with the base plate, a load beam provided with a flexure, and a piezoelectric actuator having a pair of piezoelectric elements. The piezoelectric actuator is fixed with an adhesive layer into an opening formed on the actuator base.

This related art employs a dual actuator system that uses, for a precise positioning purpose, a voice coil motor and the piezoelectric actuator having two piezoelectric elements made of, for example, PZT (lead zirconate titanate).

The piezoelectric actuator in the dual actuator system minutely moves a front end of the load beam in a widthwise direction (sway direction) of the head suspension. Compared with a single actuator system employing only the voice coil motor, the dual actuator system employing the voice coil motor and piezoelectric actuator is capable of more precisely positioning a magnetic head attached to a front end of the head suspension.

The head suspension of the dual actuator system is required to be thin to reduce an installation space. To meet the requirement, the base plate is preferably integrated with the actuator base.

Producing the integrated base plate and actuator base from a single material, however, increases cost.

Each piezoelectric element needs supply of electric power. For this, an electrode of the piezoelectric element must electrically be connected to the actuator base. This connection is achieved by placing a conductive material such as silver paste between the electrode of the piezoelectric element and the actuator base. To secure conductivity of the connection, a part of the actuator base where the conductive material is placed is plated with gold.

If the actuator base is separated from the base plate, the gold plating to the actuator base is easy to achieve. Namely, the actuator base will be manufactured by etching a thin material or a rolled material on which many actuator bases are patterned and chained together. During the etching stage of the thin or rolled material, the chained actuator bases are together masked and plated with gold.

If the actuator base is integral with the base plate, such a collective masking and plating process is impossible to achieve because a boss must be formed in the base plate and a burr removing process and a heat treatment must be carried out. These processes are hardly achievable on chained objects, and therefore, the integrated base plate and actuator base must be separated from the others before conducting the processes. Once separated, each integrated base plate and actuator base is in the size of, for example, several millimeters, and therefore, is difficult to partly mask and partially plate with gold. To avoid this difficulty, the integrated base plate and actuator base may entirely be plated with gold. This, however, increases cost.

SUMMARY OF THE INVENTION

An object of the present invention is to provide a head suspension that is thin and is capable of securing conductivity between an electrode of a piezoelectric element and an actuator base of the head suspension, as well as a method of manufacturing such a head suspension.

In order to accomplish the object, an aspect of the present invention provides a head suspension having a conductive base plate, a piezoelectric element, and a load beam, the piezoelectric element deforming in response to a voltage applied thereto and thereby moving the load beam relative to the base plate in a sway direction. The head suspension includes an actuator base integral with the base plate, an auxiliary plate being a discrete part from the base plate and the actuator base and having a surface support and a side support, the surface support facing a periphery of a surface of the piezoelectric element, the side support facing in the sway direction a side face of the piezoelectric element, an attaching part electrically connected to the base plate and formed of the actuator base and auxiliary plate, the attaching part being present between the base plate and the load beam and being configured to attach the piezoelectric element thereto, a non-conductive adhesive layer interposed between the attaching part and the piezoelectric element, to adhere the piezoelectric element to the attaching part, and a conductive material configured to electrically connect an electrode plane of the piezoelectric element and the side support to each other.

According to this aspect of the present invention, the attaching part has the surface support and side support and the piezoelectric element is attached to the attaching part with the nonconductive adhesive layer. The electrode plane of the piezoelectric element and the side support are electrically connected to each other with the conductive material. The integrated base plate and actuator base makes the head suspension thin. The conductive material secures conductivity between the electrode plane of the piezoelectric element and the actuator base.

BRIEF DESCRIPTION OF THE DRAWINGS

FIGS. 2A and 2B are plan views illustrating the head suspension of FIG. 1, in which FIG. 2A is a top view and FIG. 2B a bottom view;

FIGS. 3A to 3C illustrate a part of the head suspension of FIG. 1 around a piezoelectric element, in which FIG. 3A is a perspective view of the piezoelectric element and the periphery thereof, FIG. 3B a sectional view taken along a line IIIB-IIIB of FIG. 3A, and FIG. 3C a sectional view taken along a line IIIC-IIIC of FIG. 3A;

FIGS. 5A to 5D are explanatory views illustrating the method of manufacturing the head suspension of FIG. 1, in which FIG. 5A is a plan view of a window area of a work member before forming an attaching part, FIG. 5B a side view of FIG. 5A, FIG. 5C a plan view of the window area of the work member after forming the attaching part, and FIG. 5D a side view of FIG. 5C;

FIGS. 8A to 8D are explanatory views illustrating the method of manufacturing the head suspension of FIG. 6A, in which FIG. 8A is a plan view of a window area of a work member before forming an attaching part, FIG. 8B a side view of FIG. 8A, FIG. 8C a plan view of the window area of the work member after forming the attaching part, and FIG. 8D a side view of FIG. 8C;

FIGS. 9A and 9B are plan views illustrating a head suspension according to a fifth embodiment of the present invention, in which FIG. 9A is a top view and FIG. 9B a bottom view.

DETAILED DESCRIPTION OF EMBODIMENTS

Head suspensions and methods of manufacturing the head suspensions according to embodiments of the present invention will be explained in detail with reference to the drawings. The head suspension of each embodiment is thin and secures conductivity between an electrode of a piezoelectric element and an actuator base. For this, the head suspension has an attaching part to which the piezoelectric element is attached, the attaching part having a surface support and a side support. The piezoelectric element is attached to the attaching part with a nonconductive adhesive layer. An electrode plane of the piezoelectric element and the side support of the attaching part are electrically connected to each other with a conductive material.

Figure 1:
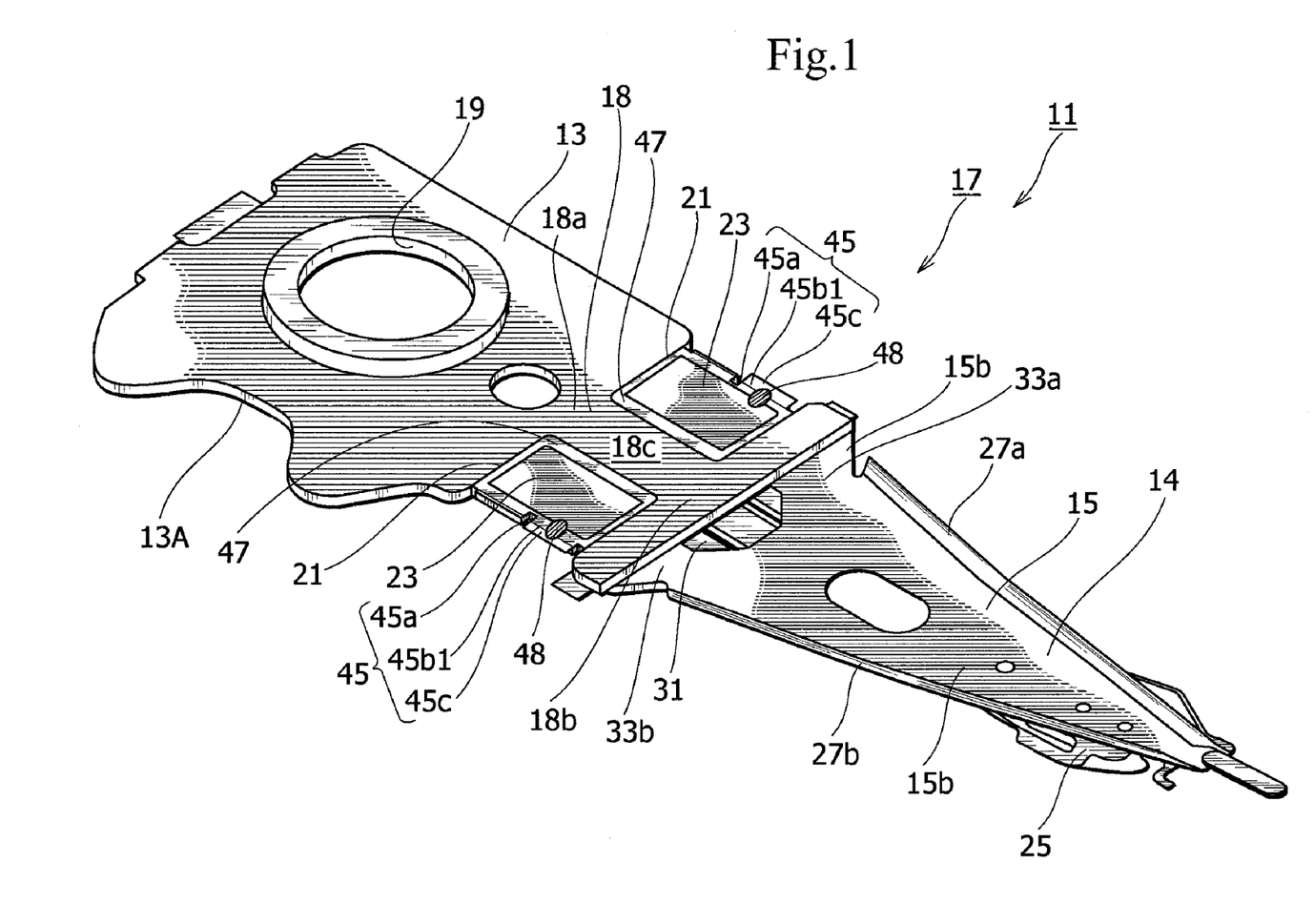
FIG. 1 is a perspective view illustrating a head suspension according to a first embodiment of the present invention.

A head suspension according to the first embodiment of the present invention will be explained with reference to FIGS. 1 to 3C in which FIG. 1 is a perspective view illustrating the head suspension, FIG. 2A a top view of the head suspension, FIG. 2B a bottom view of the same, FIG. 3A a perspective view of a piezoelectric element area of the head suspension, FIG. 3B a sectional view taken along a line IIIB-IIIB of FIG. 3A, and FIG. 3C a sectional view taken along a line IIIC-IIIC of FIG. 3A.

In the following explanation, a base plate side of the head suspension is referred to as a base end side or a rear side and a load beam side of the head suspension as a front end side or a front side. A side of the head suspension opposite to a disk, for which the head suspension is arranged to read and write data, is referred to as a surface side and a side of the head suspension facing the disk as a back side or a bottom side. A side closer to a center axis of the head suspension is referred to as an inner side and a side distal from the center axis as an outer side.

Figure 2A:
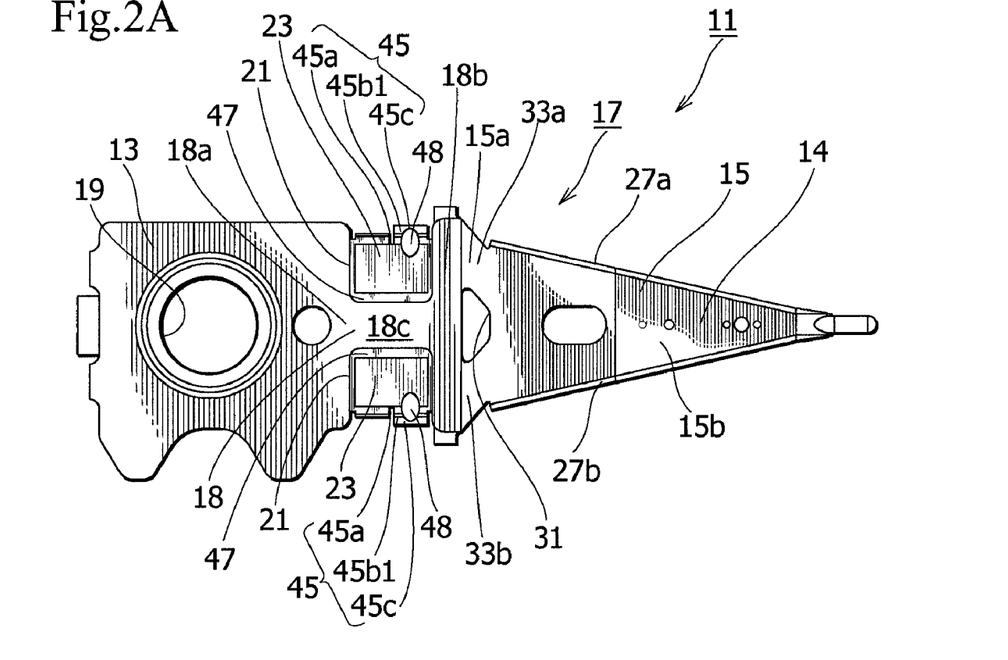
Figure 2B:
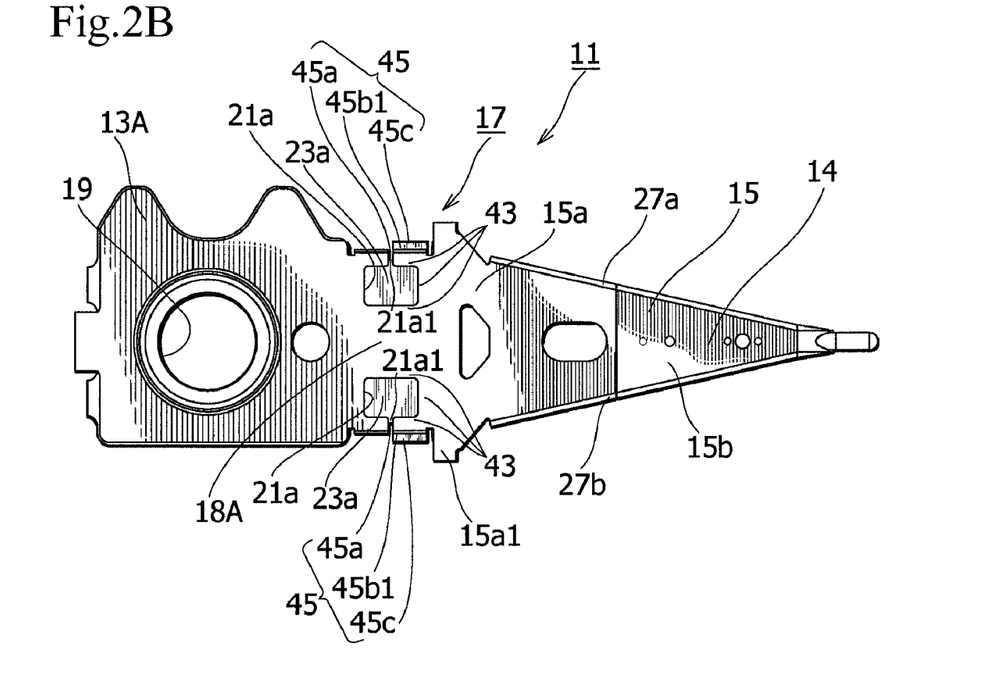

The head suspension 11 according to the first embodiment has a base plate 13, a load beam 15, and a work member 14 that includes a part of an attaching part as illustrated in FIGS. 1, 2A and 2B.

The base plate 13 is a metal thin plate made of, for example, stainless steel having a thickness in the range of about 150 to 200 μm.

A base end of the base plate 13 has a boss 19 that is nearly circular. With the boss 19, the base plate 13 is fixed to a front end of an actuator arm (not illustrated) that is driven by a voice coil motor (not illustrated).

A front end of the base plate 13 is integral with an actuator base 18, to realize thinness compared with the case if a discrete base plate and a discrete actuator base are partly overlapped to be fixed together.

The work member 14 includes a reinforcing plate 13A, an auxiliary plate 18A, and the load beam 15.

The reinforcing plate 13A is laid on and fixed to the base plate 13, thereby reinforcing the base plate 13. The reinforcing plate 13A has a boss 19 corresponding to the boss 19 of the base plate 13. The reinforcing plate 13A may be omitted like the fifth embodiment to be explained later with reference to FIGS. 9A and 9B in which a rear end of the work member 14 is laid on and fixed to a front end of the base plate 13.

The load beam 15 has a resilient part 15a and a rigid part 15b which is in front of the resilient part 15a. A rear end 15a1 of the resilient part 15a is integral with the auxiliary plate 18A. The auxiliary plate 18A is a discrete part from the base plate 13 and is laid on and fixed to the actuator base 18, to function as the attaching part to which a pair of piezoelectric elements 23 is attached.

The load beam 15 applies load onto a magnetic head slider (not illustrated) attached to a front end of a flexure 25 arranged on the load beam 15.

The flexure 25 is made of a stainless steel thin plate that is thinner, more precisely and resiliently than the load beam 15. The flexure 25 has a multilayered structure including, from the work member 14 side, a conductive base layer 25a, an insulating layer 25b, and a conductor layer 25c as illustrated in FIG. 3B. The flexure 25 is fixed to the bottom side of the work member 14 by, for example, laser spot welding.

The conductive base layer 25a of the flexure 25 is a metal thin plate made of, for example, stainless steel. The insulating layer 25b is made of an insulating material such as polyimide resin. The conductor layer 25c is made of a conductive material such as copper and nickel. The conductor layer 25c supplies electricity to an electrode plane of the piezoelectric element 23 and transmits write and read signals to and from the magnetic head slider.

Along each side of the rigid part 15b, the load beam 15 has bent edges 27a and 27b to improve rigidity of the load beam 15.

The resilient part 15a of the load beam 15 has a hole 31 to reduce a thickness-direction rigidity (bending rigidity) and lower the weight of the head suspension 11. On each side of the hole 31, the resilient part 15a has hinges 33a and 33b bendable in the thickness direction.

A piezoelectric actuator 17 of the head suspension 11 will be explained. The piezoelectric actuator 17 is an essential part of the first embodiment of the present invention.

The piezoelectric actuator 17 includes the actuator base 18, the auxiliary plate 18A, and the piezoelectric elements 23 as illustrated in FIGS. 1 and 3A to 3C. The auxiliary plate 18A has a surface support 43 and a side support 45. Each piezoelectric element 23 has a thickness in the range of about 0.07 to 0.20 mm.

The actuator base 18 has a base end 18a, a front end 18b, a connection 18c, and a pair of openings 21. The connection 18c is a band-shaped portion arranged on a center in the sway direction and extending along a front-rear direction to connect the base end 18a and front end 18b to each other.

The openings 21 are arranged side by side and are defined by the base end 18a, front end 18b, and connection 18c of the actuator base 18, respectively. Each opening 21 has a rectangular shape to receive the piezoelectric element 23.

The openings 21 of the actuator base 18 and the surface support 43 and side support 45 of the auxiliary plate 18A form the attaching part electrically connected to the base plate 13. The surface support 43 and side support 45 of the attaching part surround a circumferential part 23d of the piezoelectric element 23.

Figure 3A:
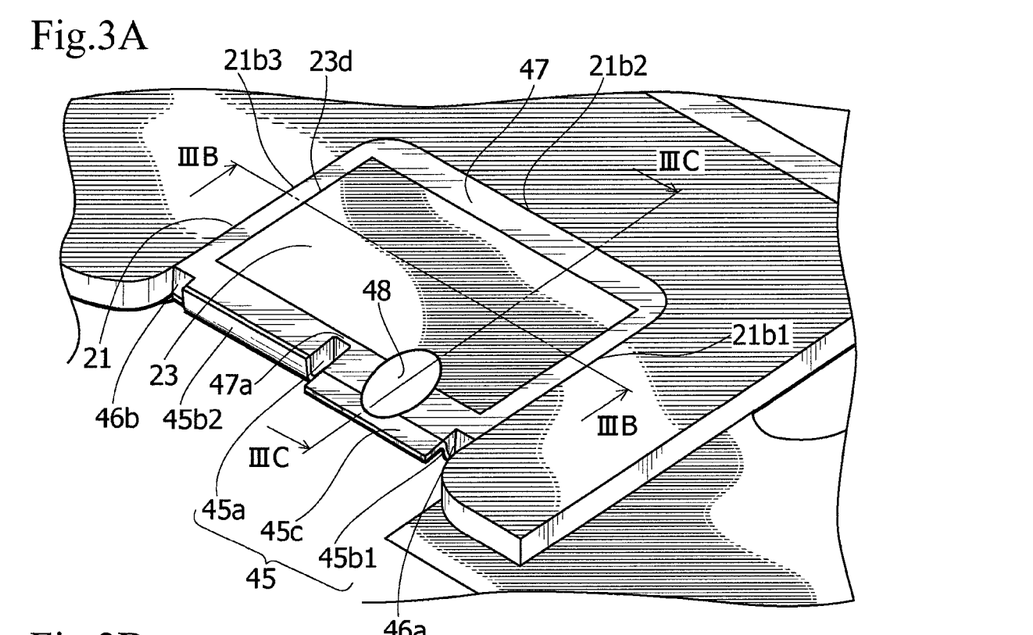

As illustrated in FIG. 3A, the piezoelectric element 23 has a rectangular shape and the circumferential part 23d of the piezoelectric element 23 is surrounded by a front wall 21b1, an inner wall 21b2, and a rear wall 21b3 of the opening 21 and by the side support 45.

External dimensions of the piezoelectric element 23 are slightly smaller than dimensions of the opening 21 so that the piezoelectric element 23 is accommodated in the opening 21.

Each piezoelectric element 23 is made of, for example, PZT (lead zirconate titanate) and has a surface electrode 23a and a bottom electrode 23b forming electrode planes each made of conductive material such as gold (Au) on the piezoelectric element 23 as illustrated in FIGS. 1 and 2A. The surface electrode 23a and bottom electrode 23b are made by vapor deposition, spattering, plating, or the like. The two piezoelectric elements 23 employed for the head suspension 11 according to the first embodiment substantially have the same configuration, shape, and size.

The piezoelectric elements 23 are embedded side by side in the openings 21. When the piezoelectric element 23 is set in the opening 21, the surface (electrode plane) of the surface electrode 23a is lower than a surface 18d of the actuator base 18 so that the piezoelectric element 23 appears to be embedded in the opening 21 as illustrated in FIG. 3B.

In practice, the piezoelectric element 23 is set in the opening 21 so that the surface of the surface electrode 23a of the piezoelectric element 23 is flush with or lower than the surface 18d of the actuator base 18.

The surface support 43 is arranged to face a periphery 23b1 of the bottom surface that is non-electrode plane having no bottom electrode 23b of each piezoelectric element 23. As illustrated in FIG. 2B, the surface support 43 is a part of the auxiliary plate 18A of the work member 14, and therefore, is conductive.

Figure 3B:
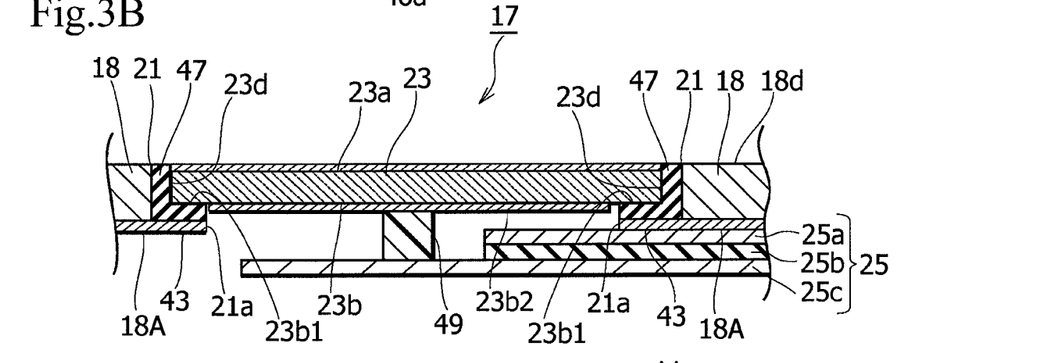
Figure 3C:
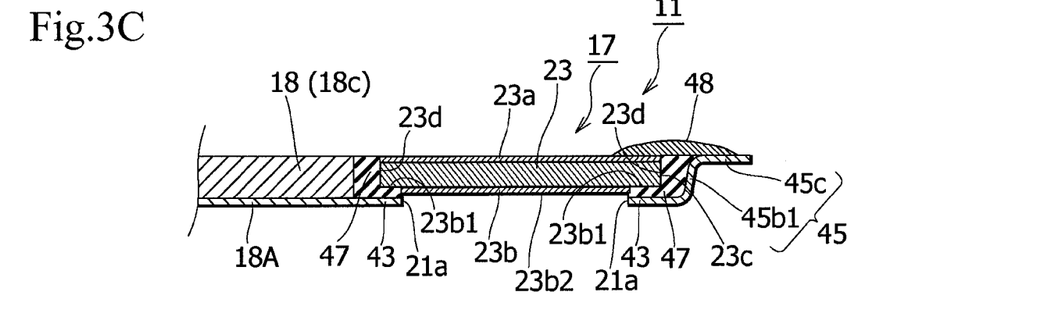

The surface support 43 has a rectangular window 21a corresponding to a central part 23b2 (electrode plane) of the bottom surface of the piezoelectric element 23, so that the bottom electrode 23b of the piezoelectric element 23 is visible from the back of the actuator base 18 as illustrated in FIGS. 2B, 3B and 3C.

The surface support 43 completely receives a nonconductive adhesive layer 47 applied between the periphery 23b1 of the bottom surface of the piezoelectric element 23 and the surface support 43.

The side support 45 is arranged to face an outer side face 23c of the piezoelectric element 23. Like the surface support 43, the side support 45 is a part of the auxiliary plate 18A of the work member 14, and therefore, is conductive.

As illustrated in FIGS. 2B and 3A, the side support 45 has a gap 45a corresponding to a central part of the outer side face 23c of the piezoelectric element 23.

The gap 45a is continuous to a slit 21a1 of the window 21a. Namely, an inner space of the window 21a communicates with the outside of the window 21a through the slit 21a1 and gap 45a.

The window 21a and gap 45a make both the surface support 43 and side support 45 discontinuous in the front-rear direction and form a displacement allowing part to allow the piezoelectric actuator 17 to displace. Namely, the displacement allowing part allows a swaying operation of the piezoelectric actuator 17.

A part of the side support 45 in front of the gap 45a is a front side support 45b1 that includes a connection face 45c formed on a flange and horizontally outwardly extending to be flush with the surface electrode 23a of the piezoelectric element 23.

The connection face 45c functions to completely receive a conductive material 48 such as silver paste and improve rigidity of the front side support 45b1 to firmly support the piezoelectric element 23. Firmly supporting the piezoelectric element 23 results in surely achieving a piezoelectric displacement between front and rear parts with respect to the gap 45a and improving durability of the conductive material 48.

A part of the side support 45 on a rear side of the gap 45a is a rear side support 45b2 that is not provided with the connection face 45c.

The connection face 45c may be formed on the rear side support 45b2 instead of the front side support 45b1. Alternatively, the connection face 45c may be formed on each of the front and rear side supports 45b1 and 45b2. Further, the connection face 45c may be omitted.

A gap 46a is formed between the front side support 45b1 and the front wall 21b1 of the opening 21 and a gap 46b is formed between the rear side support 45b2 and the rear wall 21b3 of the opening 21.

When each piezoelectric element 23 is set in the corresponding opening 21, there will be a space between the circumferential part 23d of the piezoelectric element 23 and the opening 21, surface support 43, and side support 45.

To surely transmit a distortion (displacement) of the piezoelectric element 23 to the load beam 15, each piezoelectric element 23 is attached to the attaching part having the surface support 43 and side support 45, as illustrated in FIG. 3B.

To attach each piezoelectric element 23 to the attaching part, the nonconductive adhesive layer 47 is densely and uniformly formed between the circumferential part 23d of the piezoelectric element 23 and the front wall 21b1, inner wall 21b2, rear wall 21b3 of the opening 21 and between the piezoelectric element 23 and the surface support 43 and side support 45.

As a result, the circumferential part 23d of the piezoelectric element 23 is closely surrounded by the front wall 21b1, inner wall 21b2, and rear wall 21b3 of the opening 21 and the side support 45 and the periphery 23b1 of the bottom surface of the piezoelectric element 23 is closely supported with the surface support 43.

As illustrated in FIG. 3A, the nonconductive adhesive layer 47 has a thin part 47a at a position corresponding to the gap 45a of the side support 45. The thin part 47a is formed by removing a parallelepiped portion of the nonconductive adhesive layer 47.

A part of the circumferential part 23d of the piezoelectric element 23 corresponding to the gap 45a is covered with the thin part 47a of the nonconductive adhesive layer 47. That is, the circumferential part 23d of the piezoelectric element 23 is entirely covered with the nonconductive adhesive layer 47.

In this way, the piezoelectric element 23 is surrounded by the front wall 21b1, inner wall 21b2, and rear wall 21b3 of the opening 21 and the side support 45. In addition, the periphery 23b1 of the bottom surface of the piezoelectric element 23 is supported with the surface support 43. In this state, the piezoelectric element 23 is surrounded by and fixed with the nonconductive adhesive layer 47. This configuration secures electrical insulation between the electrodes of the piezoelectric element 23 and the actuator base 18, prevents dust from dropping off the circumferential part 23d of the piezoelectric element 23, and protects the piezoelectric element 23 that is brittle from being damaged.

The thin part 47a of the nonconductive adhesive layer 47 may be formed with the use of a jig having a predetermined projection at the time of forming the nonconductive adhesive layer 47. The thin part 47a and displacement allowing part realize a smooth stroke motion and swaying operation of the piezoelectric actuator 17.

Instead of densely applying the nonconductive adhesive layer 47, the nonconductive adhesive layer 47 may partially be formed. The thin part 47a may be omitted. In this case, the nonconductive adhesive layer 47 is uniformly formed even at the part corresponding to the gap 45a.

The nonconductive adhesive layer 47 may be made of any known nonconductive adhesive or any known conductive adhesive mixed with insulating particles such as silica particles and glass particles.

As illustrated in FIGS. 2A, 3A, and 3C, the conductive material 48 such as silver paste is formed across the nonconductive adhesive layer 47, to electrically connect the surface electrode 23a of the piezoelectric element 23 to the side support 45 (more precisely, the connection face 45c of the front side support 45b1). Namely, the surface electrode 23a of the piezoelectric element 23 is grounded through the side support 45 and surface support 43 to the actuator base 18.

The location of the conductive material 48 may be close to a corner of the outer side face 23c of the piezoelectric element 23, not to interfere with a stroke motion of the piezoelectric actuator 17.

As illustrated in FIG. 3B, the bottom electrode 23b of the piezoelectric element 23 is connected through a solid-cylindrical conductive adhesive block 49 to the conductor layer 25c of the flexure 25. The bottom electrode 23b and the conductor layer 25c of the flexure 25 may be connected through wire bonding, soldering, ultrasonic bonding, or the like instead of the conductive adhesive block 49.

When a predetermined voltage is applied to the piezoelectric actuator 17, one of the piezoelectric elements 23 longitudinally contracts and the other longitudinally expands, to deform the piezoelectric actuator 17 into a trapezoid.

Depending on the deformation and displacement of the piezoelectric elements 23, the piezoelectric actuator 17 displaces a front end of the load beam 15 relative to the base plate 13 in a widthwise direction (sway direction).

A method of manufacturing the head suspension according to the first embodiment will be explained.

Figure 4:
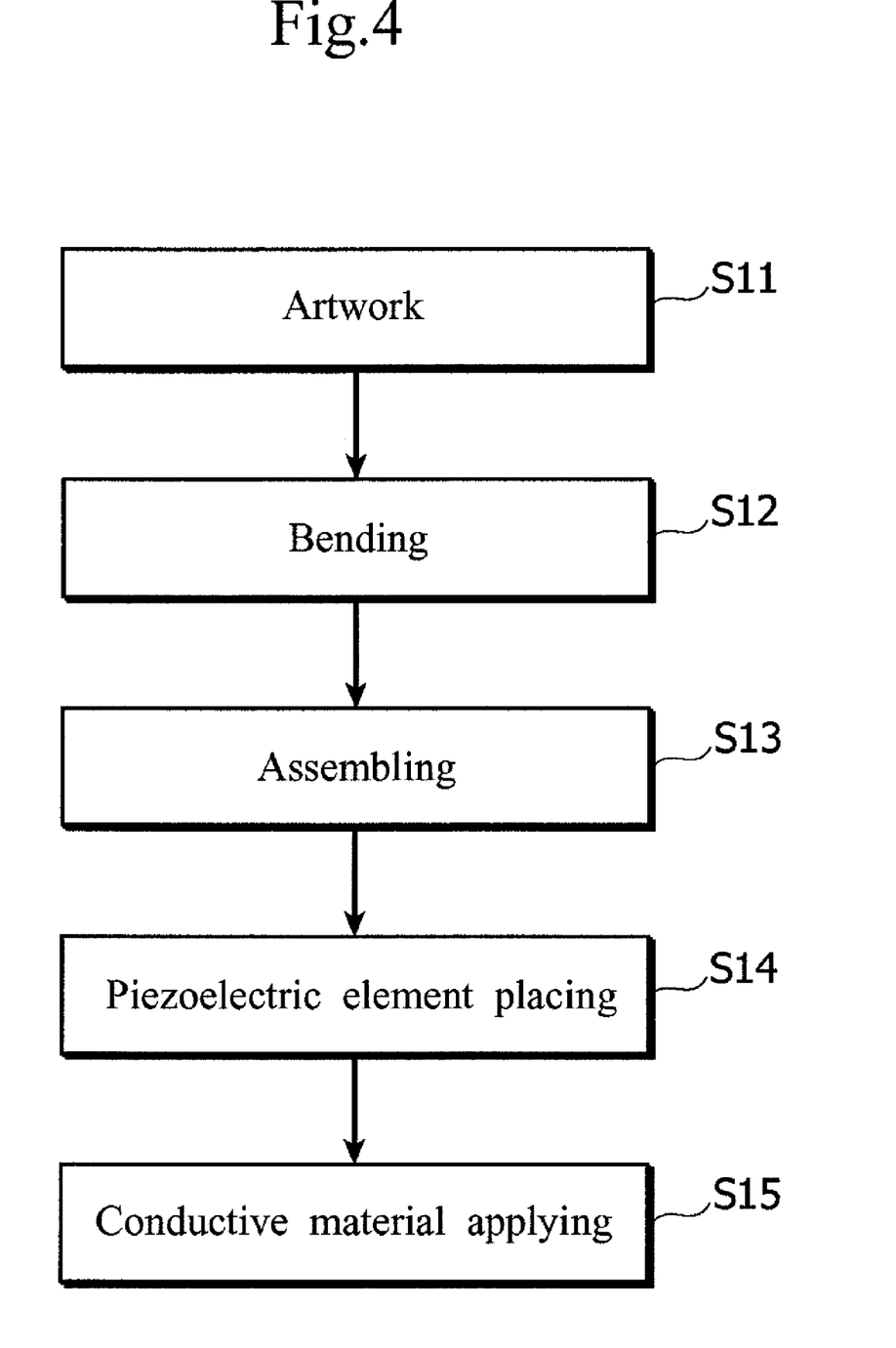
FIG. 4 is an explanatory view illustrating a method of manufacturing the head suspension of FIG. 1.
Figure 5A:
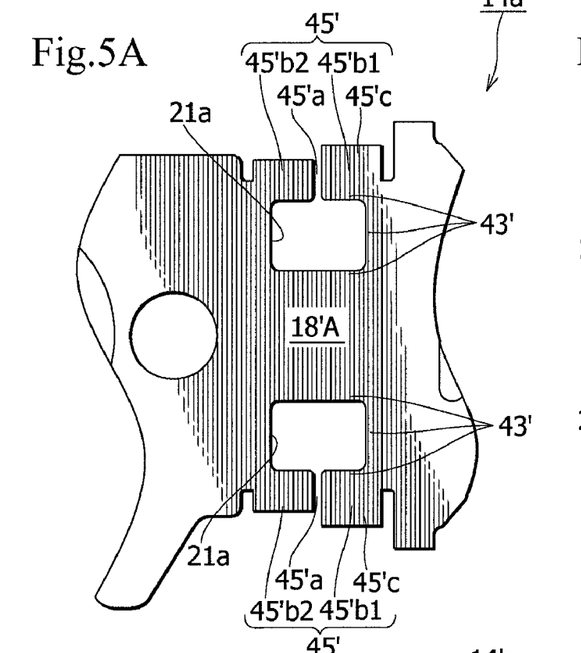
Figure 5B:
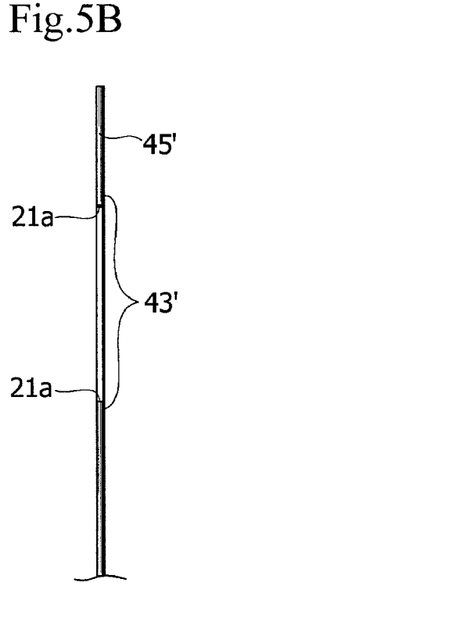
Figure 5C:
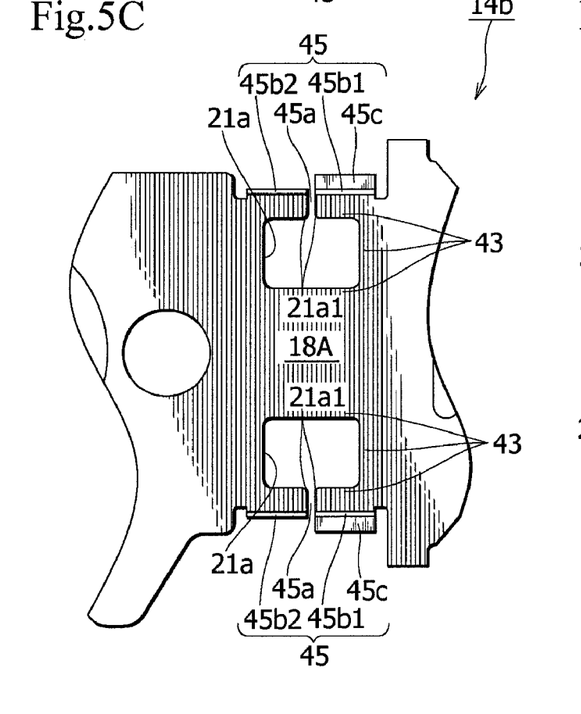
Figure 5D:
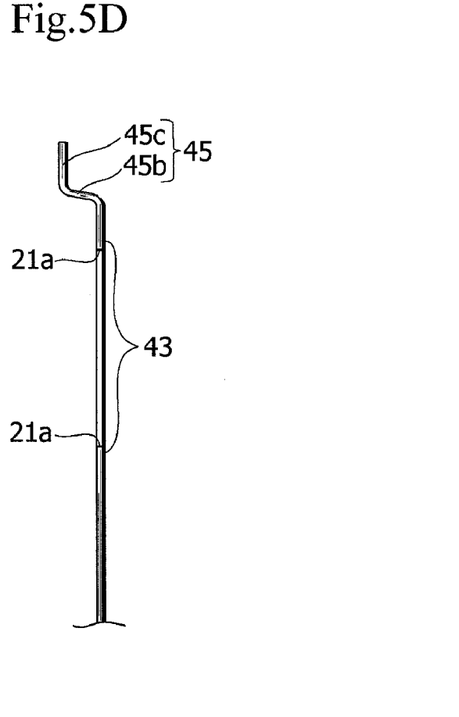

FIG. 4 is an explanatory view illustrating the method, FIG. 5A a plan view of a window area of the work member 14 before forming the attaching part, FIG. 5B a side view of FIG. 5A, FIG. 5C a plan view of the window area of the work member 14 after forming the attaching part, and FIG. 5D a side view of FIG. 5C.

Step S11 carries out artwork to prepare the base plate 13, a first half-finished work 14a, and the like formed from base materials by punching or etching. For example, an auxiliary plate 18'A is formed as a part of the first half-finished work 14a from a stainless steel plate material by pressing, as illustrated in FIG. 5A.

In FIG. 5A, a part 43' to serve as the surface support 43 and a part 45' to be shaped into the side support 45 are formed on the first half-finished work 14a by punching. The side support part 45' includes a gap part 45'a, a front side support part 45'b1, a rear side support part 45'b2, and a connection face part 45'c.

Step S12 bends the side support part 45' of the first half-finished work 14a relative to the surface support part 43' and bends the connection face part 45'c relative to the side support part 45'.

This results in forming a second half-finished work 14b having the side support 45 and connection face 45c as illustrated in FIGS. 5C and 5D. The side support 45 and connection face 45c are formed by bending with the use of a punch and die.

In this way, step S12 forms the side support 45 and connection face 45c that are bent relative to the surface support 43.

Step S13 assembles the parts. The base plate 13 and the second half-finished work 14b that is the work member 14 are laid one on another and are fixed to each other with a laser spot welder (not illustrated).

In this way, step S13 prepares the head suspension 11 illustrated in FIGS. 1, 2A, and 2B.

Steps S12 and S13 correspond to an attaching part forming step forming the attaching part by providing a half-finished work member with the base plate and load beam.

Step S14 places each piezoelectric element 23 onto the attaching part having the surface support 43 and side support 45. At this time, the nonconductive adhesive layer 47 is densely formed between the circumferential part 23d of the piezoelectric element 23 and the opening 21, surface support 43, and side support 45. Step S14 corresponds to an attaching step attaching the piezoelectric element to the attaching part with the nonconductive adhesive layer.

Step S15 applies the conductive material 48 to each piezoelectric element 23. Namely, the conductive material 48 that has fluidity at first is applied across the nonconductive adhesive layer 47 between the surface electrode 23a of the piezoelectric element 23 and the side support 45. As a result, the surface electrode 23a of each piezoelectric element 23 is grounded through the side support 45 and surface support 43 (auxiliary plate 18A) to the actuator base 18. Step S15 corresponds to a applying step applying the conductive material" stipulated in the claims.

Effect of the First Embodiment will be Explained

According to the first embodiment, the head suspension 11 has the attaching part that is provided with the surface support 43 and side support 45, to surround the circumferential part 23d of the piezoelectric element 23 with the nonconductive adhesive layer 47 interposed between them.

The piezoelectric element 23, the nonconductive adhesive layer 47 surrounding the circumferential part 23d of the piezoelectric element 23, and the attaching part having the surface support 43 and side support 45 cooperate to function as a support beam.

The side support 45 is divided at the gap 45a into the front side support 45b1 and rear side support 45b2. Even with this structure, the rear side support 45b2 and the front side support 45b1 are joined through the nonconductive adhesive layer 47 to the piezoelectric element 23, to improve rigidity around the piezoelectric element 23.

The displacement allowing part including the window 21a and gap 45a separates the surface support 43 and side support 45 into front and rear parts, to allow a displacement of the piezoelectric actuator 17 and surely transmit the displacement to the load beam 15.

This configuration suppresses the width of the head suspension 11 and secures basic characteristics such as vibration characteristic and shock resistance for the head suspension 11.

According to the first embodiment, the conductive material 48 is formed across the nonconductive adhesive layer 47 to electrically connect the surface electrode 23a (electrode plane) of the piezoelectric element 23 to the side support 45.

The first embodiment may form, like the related art, the conductive material 48 in the front-rear direction across the nonconductive adhesive layer 47, to electrically connect the surface electrode 23a of the piezoelectric element 23 to the actuator base 18. Namely, the first embodiment allows a path for the conductive material 48 to be selected from between the conventional front-rear path and the embodiment's sway-direction path, thereby improving the degree of freedom of designing.

There is a case that a part of the base plate 13 adjacent to the surface electrode 23a of the piezoelectric element 23 is unable to plate with conductive metal such as gold due to, for example, a masking problem.

In this case, the embodiment's sway-direction path for the conductive material 48 is beneficial. The embodiment employs the auxiliary plate 18A that is separated from the base plate 13, forms the surface support 43 and side support 45 on the auxiliary plate 18A, and applies the partial plating to the auxiliary plate 18A (at least the side support 45) with conductive metal such as gold. Thereafter, the embodiment forms the conductive material 48 across the nonconductive adhesive layer 47 to electrically connect the surface electrode 23a of the piezoelectric element 23 to the side support 45, thereby securing good conductivity between them.

The head suspension 11 according to the first embodiment is thin because the base plate 13 and actuator base 18 are integrated together and secures conductivity between the surface electrode 23a of the piezoelectric element 23 and the actuator base 18 because of the side support 45 and the conductive material 48.

The conductive path achieved with conductive material 48 surely grounds the electrode 23a of the piezoelectric element 23 thereby improving quality of the head suspension 11.

Two attaching parts each having the surface support 43 and side support 45 may be formed side by side in the sway direction, to receive the piezoelectric elements 23, respectively.

The connection face 45c of the side support 45 to receive the conductive material 48 is flush with the surface electrode 23a of the piezoelectric element 23. This configuration expands an area to which the conductive material 48 is applied, thereby reducing contact resistance and securing conductivity between the conductive material 48 and the area to which the conductive material 48 is applied.

The surface of the side support 45 is plated with conductive metal such as gold. This configuration decreases contact resistance and secures conductivity between the conductive material 48 and the part to which the conductive material 48 is applied.

The side support 45 may have a receptacle 75 (85, 95) to receive the conductive material 48. This configuration surely holds the conductive material 48 and secures conductivity.

The head suspension 11 according to the first embodiment has no flexible link that outwardly protrudes to improve rigidity but decrease a displacement stroke. Without the flexible link, the head suspension 11 increases productivity, i.e., the number of products to be formed from a single material.

The head suspension 11 according to the first embodiment holds a width similar to that of a standard head suspension, and therefore, is manufacturable through an existing head suspension manufacturing line. This suppresses facility cost.

The actuator base 18 according to the first embodiment may be formed by pressing. In this case, the actuator base 18 has no projections such as flexible links, and therefore, burrs are smoothly removable from the actuator base 18 by barrel polishing, to reduce manufacturing cost.

When designing a magnetic disk drive in which the head suspension 11 is installed, there is no need to consider an interference of the head suspension 11 with peripheral parts because the head suspension 11 has no projections such as flexible links. Namely, the head suspension 11 according to the first embodiment secures the degree of freedom when designing an arrangement of peripheral parts around the head suspension 11.

In connection with a vibration characteristic, the head suspension 11 according to the first embodiment involves only standard vibration modes and no special vibration modes because the head suspension 11 has no projections such as flexible links. Accordingly, the head suspension 11 according to the first embodiment can be designed through conventional design steps.

According to the first embodiment, the piezoelectric element 23 is surrounded by the front wall 21b1, inner wall 21b2, and rear wall 21b3 of the opening 21 and the side support 45. In addition, the periphery 23b1 of the bottom surface of the piezoelectric element 23 is supported with the surface support 43. In this state, the piezoelectric element 23 is surrounded by the nonconductive adhesive layer 47.

This configuration secures electric insulation between the electrodes of the piezoelectric element 23 and the actuator base 18, prevents dust from dropping off the circumferential part 23d of the piezoelectric element 23, and protects the brittle piezoelectric element 23 from being damaged.

The method of manufacturing the head suspension 11 according to the first embodiment includes the attaching part forming step forming the attaching part by providing a half-finished work member with the base plate 13 and the load beam 15, the attaching step attaching the piezoelectric element 23 to the attaching part with the nonconductive adhesive layer 47, and the applying step applying the conductive material 48.

Therefore, in the above-described case that a part of the base plate 13 is unable to plate with conductive metal such as gold, the method can conduct the partial plating to the auxiliary plate 18A (at least side support 45) with conductive metal such as gold. And the method can form the conductive material 48 in a sway direction across the nonconductive adhesive layer 47, to electrically connect the surface electrode 23a of the piezoelectric element 23 to the side support 45 and secure conductivity between them.

The method can realize the head suspension 11 that is thin based on the base plate 13 and actuator base 18 that are integrated together and secures conductivity between the surface electrode 23a of the piezoelectric element 23 and the actuator base 18 based on the side support 45 and the conductive material 48.

The method also realizes the conductive path achieved with the conductive material 48 and surely grounding the electrode 23a of the piezoelectric element 23 thereby improving the quality and productivity of the head suspension 11.

Figure 6A:
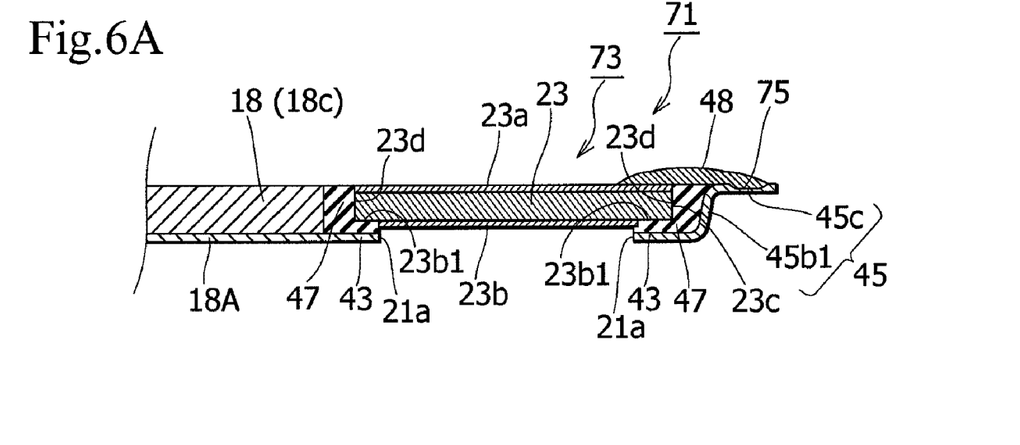
FIG. 6A is a sectional view illustrating a piezoelectric element area of a head suspension according to a second embodiment of the present invention.

A head suspension according to the second embodiment of the present invention will be explained with reference to FIG. 6A that is a sectional view illustrating a piezoelectric element area of the head suspension.

The head suspension 71 of the second embodiment is basically the same as the head suspension 11 of the first embodiment, and therefore, like parts are represented with like reference numerals to omit repetition of explanation. Only a characteristic part of the second embodiment will be explained.

According to the second embodiment, the head suspension 71 (FIG. 6A) employs a piezoelectric actuator 73 that has a receptacle 75 on a connection face 45c. The receptacle 75 is a circular recess to receive the conductive material 48.

Figure 7:
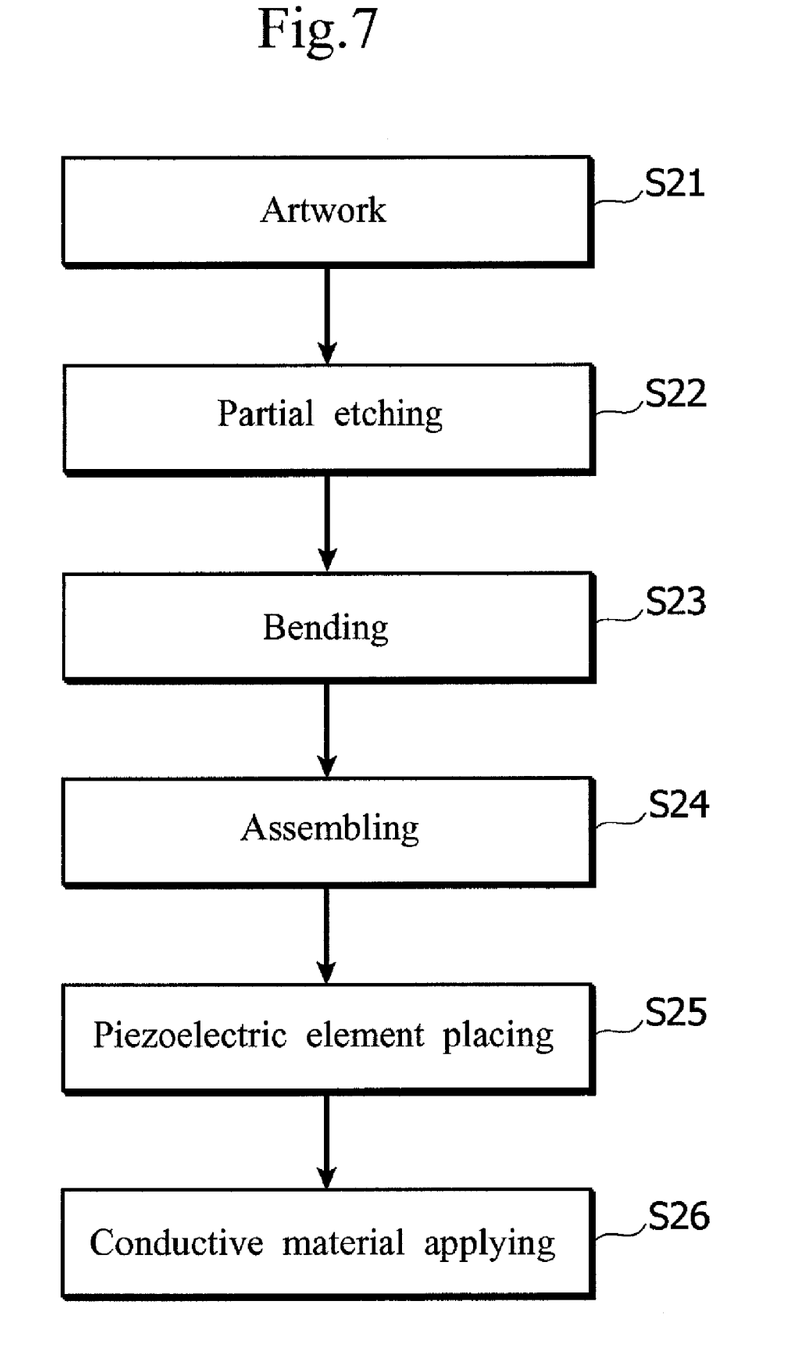
FIG. 7 is an explanatory view illustrating a method of manufacturing the head suspension of FIG. 6A.

A method of manufacturing the head suspension 71 according to the second embodiment will be explained with reference to FIGS. 7 and 8A to 8D in which FIG. 7 is an explanatory view illustrating the method, FIG. 8A a plan view of a window area of a work member before forming an attaching part, FIG. 8B a side view of FIG. 8A, FIG. 8C a plan view of the window area of the work member after forming the attaching part, and FIG. 8D a side view of FIG. 8C.

Step S21 is similar to step S11 of FIG. 4. Namely, step S21 carries out artwork to prepare components of the head suspension 71. For example, an auxiliary plate 18'A is formed as a part of a first half-finished work 14a from a stainless steel plate material by pressing, as illustrated in FIG. 8A.

Figure 8A:
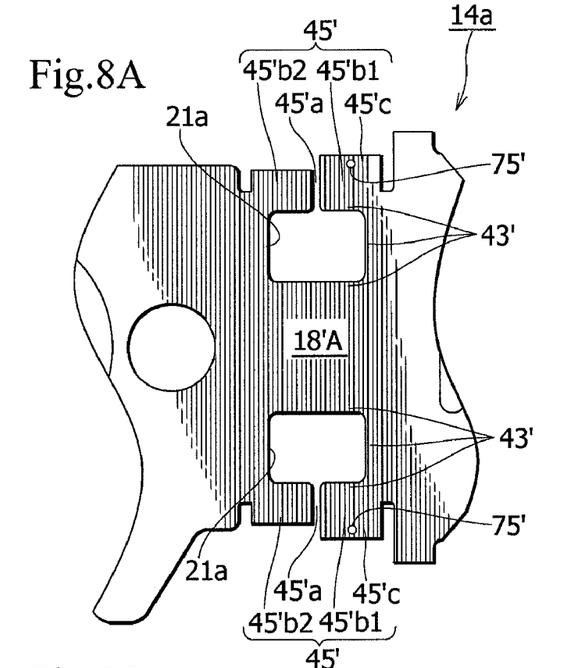
Figure 8B:
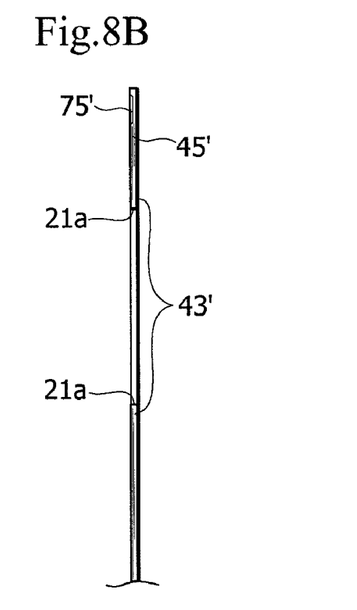
Figure 8C:
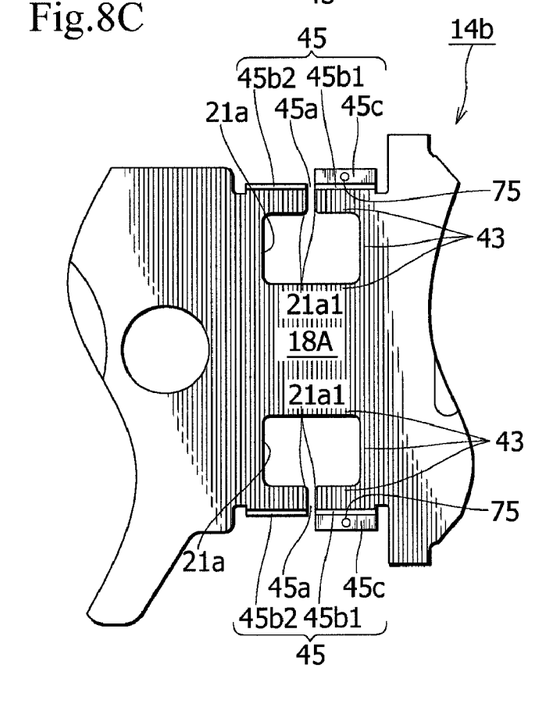
Figure 8D:
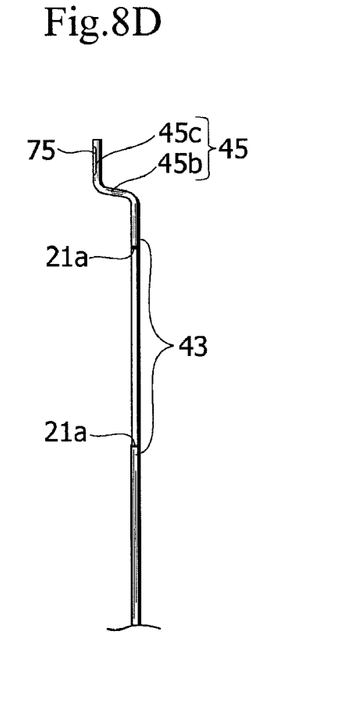

In FIG. 8A, a part 43' to become the surface support 43 and a part 45' to be shaped into the side support 45 are formed on the first half-finished work 14a by punching. The side support part 45' includes a gap part 45'a, a front side support part 45'b1, a rear side support part 45'b2, and a connection face part 45'c.

Step S22 partially etches the connection face part 45'c, to form a receptacle part 75' to become the receptacle 75 for receiving the conductive material 48 on the connection face part 45'c, as illustrated in FIG. 8A. Step S22 corresponds to an etching step partially etching a part serving as the side support, to form the receptacle.

Step S23 is similar to step S12 of FIG. 4. Namely, step S23 bends the side support part 45' and the connection face part 45'c to form a second half-finished work 14b having the side support 45 and connection face 45c provided with the receptacle 75. The side support 45 and connection face 45c are formed by bending with the use of a punch and die.

Step S24 is similar to step S13 of FIG. 4. Namely, step S24 lays the base plate 13 and the second half-finished work 14b that is the work member 14 one on another and fixes them to each other with a laser spot welder.

Steps S21 to S24 correspond to an attaching part forming step forming the attaching part by providing a half-finished work member with the base plate and the load beam.

Step S25 is similar to step S14 of FIG. 4. Namely, step S25 places each piezoelectric element 23 on the attaching part having the surface support 43 and side support 45. Step S25 corresponds to an attaching step attaching the piezoelectric element to the attaching part with the nonconductive adhesive layer.

Step S26 is similar to step S15 of FIG. 4. Namely, step S26 applies the conductive material 48 to each piezoelectric element 23. The receptacle 75 formed on the connection face 45c prevents the conductive material 48 that has fluidity when applied from oozing and holds the conductive material 48 at a predetermined position. Step S26 corresponds to the applying step applying the conductive material.

Effect of the Second Embodiment will be Explained

According to the second embodiment, the head suspension 71 has the receptacle 75 on the connection face 45c of the side support 45, to receive the conductive material 48. In addition to the effect of the first embodiment, the second embodiment surely holds the conductive material 48 at the receptacle 75 and ensures conductivity between them.

The method of manufacturing the head suspension 71 according to the second embodiment includes the attaching part forming step forming the attaching part by providing a half-finished work member with the base plate and the load beam, the attaching step attaching the piezoelectric element 23 to the attaching part with the nonconductive adhesive layer 47, and the applying step applying the conductive material 48. The method further includes the etching step partially etching a part serving as the side support 45 to form the receptacle 75. In addition to the effect of the first embodiment, the second embodiment speedily applies the conductive material 48 to a predetermined position on the head suspension 71 without oozing the conductive material 48 that has fluidity when applied.

Figure 6B:
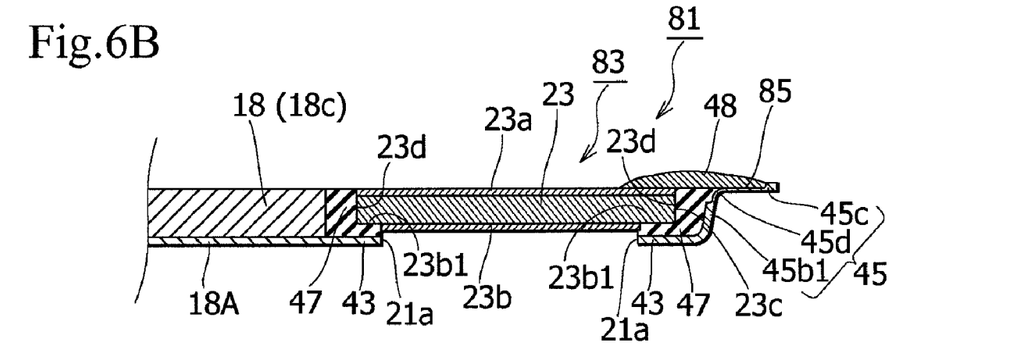
FIG. 6B is a sectional view illustrating a piezoelectric element area of a head suspension according to a third embodiment of the present invention.

A head suspension according to the third embodiment of the present invention will be explained with reference to FIG. 6B that is a sectional view illustrating a piezoelectric element area of the head suspension.

The head suspension 81 of the third embodiment is basically the same as the head suspension 71 of the second embodiment, and therefore, like parts are represented with like reference numerals to omit repetition of explanation. Only a characteristic part of the third embodiment will be explained.

According to the third embodiment, the head suspension 81 (FIG. 6B) has a piezoelectric actuator 83 that has a receptacle 85 instead of the receptacle 75 of the second embodiment. Namely, the receptacle 85 is defined by a thin portion of a front side support 45b and extends from an inner face of the front side support 45b1 to a connection face 45c over a curve 45d, to receive the conductive material 48.

A method of manufacturing the head suspension 81 according to the third embodiment is the same as that of the second embodiment, and therefore, is not explained again.

Effect of the Third Embodiment will be Explained

According to the third embodiment, the head suspension 81 has the receptacle 85 on the connection face 45c of the side support 45. The receptacle 85 extends from the inner face of the front side support 45b1 to the connection face 45c over the curve 45d. Like the second embodiment, the third embodiment surely holds the conductive material 48 at the receptacle 85 and ensures conductivity between them.

Like the second embodiment, the manufacturing method of the third embodiment is capable of speedily applying the conductive material 48 to a predetermined position on the head suspension 81 without oozing the conductive material 48 that has fluidity when applied.

Figure 6C:
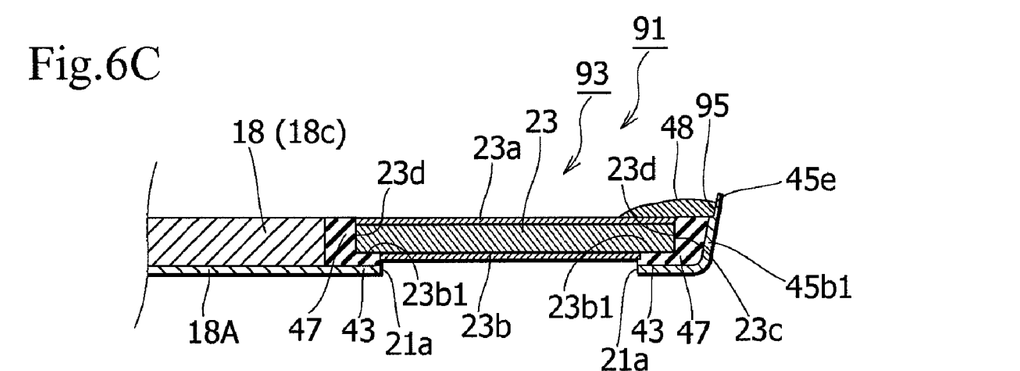
FIG. 6C is a sectional view illustrating a piezoelectric element area of a head suspension according to a fourth embodiment of the present invention.

A head suspension according to the fourth embodiment of the present invention will be explained with reference to FIG. 6C that is a sectional view illustrating a piezoelectric element area of the head suspension.

The head suspension 91 of the fourth embodiment is basically the same as the head suspensions 71 and 81 of the second and third embodiments, and therefore, like parts are represented with like reference numerals to omit repetition of explanation. Only a characteristic part of the fourth embodiment will be explained.

According to the fourth embodiment, the head suspension 91 (FIG. 6C) has a piezoelectric actuator 93 that has no connection face 45c of the second and third embodiment and has a projection 45e. Namely, a side support 45 of the fourth embodiment rises from a surface support 43 higher than a surface electrode 23a of a piezoelectric element 23, to form the projection 45e. The projection 45e is thinner than the side support 45 and defines a receptacle 95 to receive the conductive material 48 inside.

A method of manufacturing the head suspension 91 according to the fourth embodiment is the same as that of the second (third) embodiment.

Effect of the Fourth Embodiment will be Explained

According to the fourth embodiment, the head suspension 91 has the piezoelectric actuator 93 that has the projection 45e. The side support 45 rises from the surface support 43 higher than the surface electrode 23a of the piezoelectric element 23, to form the projection 45e. The projection 45e defines the receptacle 95 to receive the conductive material 48. In addition to the effect of the second and third embodiments, the fourth embodiment stops the conductive material 48 that has fluidity when applied with the projection 45e and surely prevents the fluent conductive material 48 from spreading.

In addition to the effect of the second and third embodiments, the manufacturing method of the fourth embodiment surely prevents the conductive material that has fluidity when applied from oozing and speedily applies the conductive material 48 to a predetermined position on the head suspension 81.

Figure 9A:
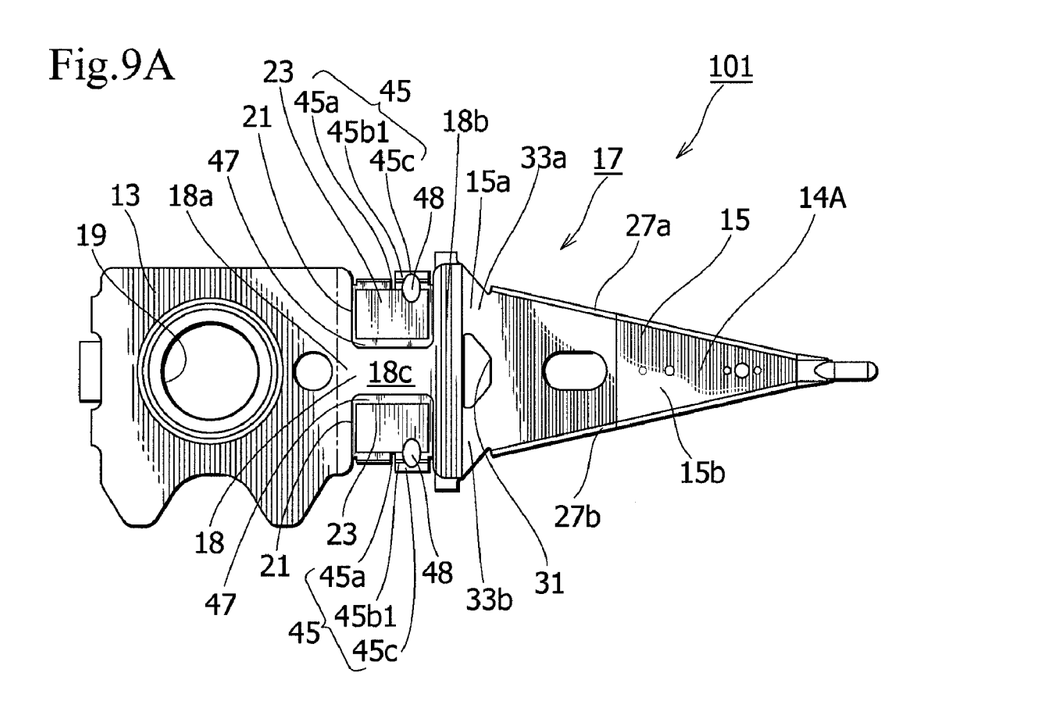
Figure 9B:
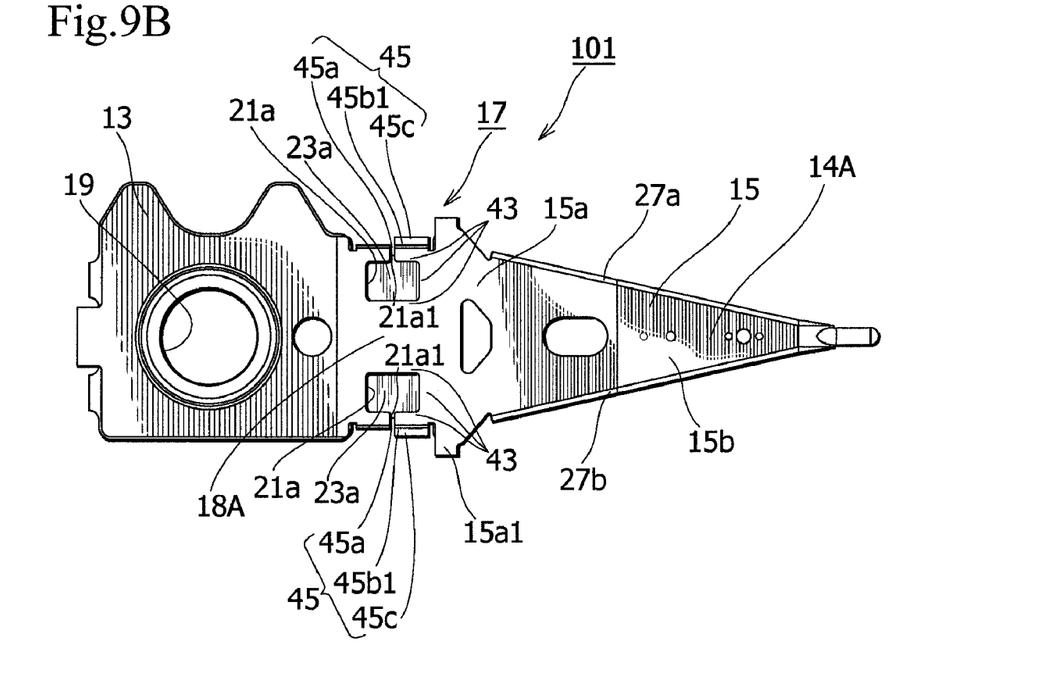

A head suspension according to the fifth embodiment of the present invention will be explained with reference to FIGS. 9A and 9B in which FIG. 9A is a top view and FIG. 9B a bottom view illustrating the head suspension.

The head suspension 101 of the fifth embodiment is basically the same as the head suspension 11 of the first embodiment, and therefore, like parts are represented with like reference numerals to omit repetition of explanation. Only a characteristic part of the fifth embodiment will be explained.

According to the fifth embodiment, the head suspension 101 has no reinforcing plate 13A to be laid on and fixed to the base plate 13 of an auxiliary plate 18A. Namely, a work member 14A includes the auxiliary plate 18A and a load beam 15.

A rear end of the work member 14A is laid on and fixed to a front end of the base plate 13.

The auxiliary plate 18A may be separated from a rear end 15a1 of a resilient part 15a of the load beam 15, so that the load beam 15 becomes discrete. In this case, the rear end 15a1 of the resilient part 15a is laid on and fixed to the front end 18b of the actuator base 18 that is integral with the base plate 13.

Effect of the Fifth Embodiment is Similar to that of the First Embodiment

Figure 10:
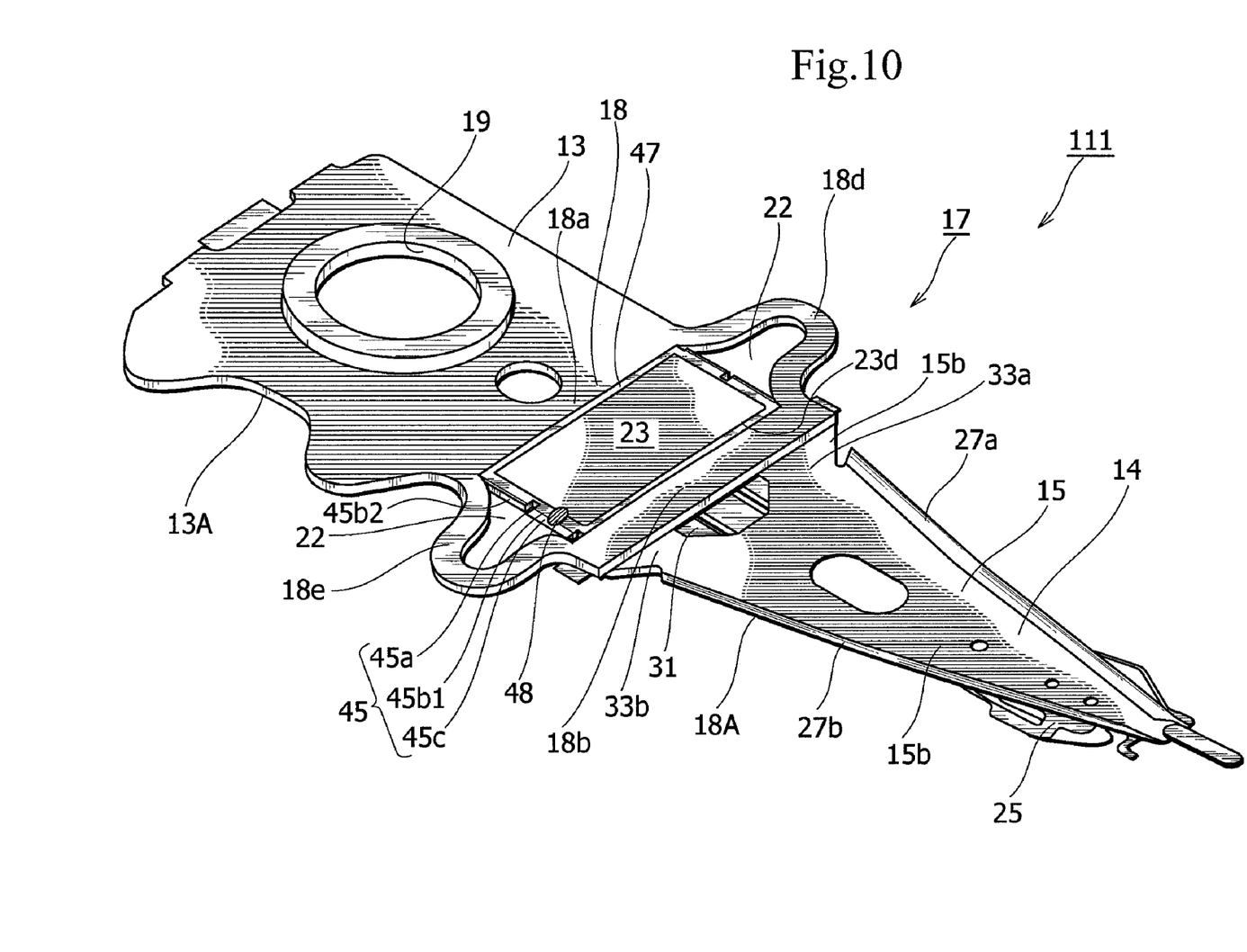
FIG. 10 is a perspective view illustrating a head suspension according to a sixth embodiment of the present invention.

A head suspension according to the sixth embodiment of the present invention will be explained with reference to FIG. 10 that is a perspective view illustrating the head suspension.

The head suspension 111 of the sixth embodiment is basically the same as the head suspension 11 of the first embodiment, and therefore, like parts are represented with like reference numerals to omit repetition of explanation. Only a characteristic part of the sixth embodiment will be explained.

According to the sixth embodiment, the head suspension 111 has an actuator base 18 that has a single opening 22 instead of a pair of openings 21 arranged side by side across the connection 18c of the first embodiment. Namely, the opening 22 is defined by a base end 18a and front end 18b of the actuator base 18 and by a pair of flexible links 18d and 18e each having a U-shape. The flexible links 18d and 18e connect the base end 18a and front end 18b to each other and outwardly protrude in a sway direction. The opening 22 accommodates a single piezoelectric element 23 having a rectangular shape with a nonconductive adhesive layer 47 interposed between them.

According to the sixth embodiment, the single opening 22 of the actuator base 18 and a surface support 43 and side support 45 of an auxiliary plate 18A form the attaching part.

Effect of the Sixth Embodiment will be Explained

According to the sixth embodiment, the head suspension 111 has the flexible links 18d and 18e. The attaching part having the surface support 43 and side support 45 accommodates the piezoelectric element 23 with the nonconductive adhesive layer 47 surrounding a circumferential part 23d of the piezoelectric element 23.

The flexible links 18d and 18e improve rigidity around the piezoelectric element 23. The piezoelectric element 23, the nonconductive adhesive layer 47 surrounding the circumferential part 23d of the piezoelectric element 23, and the attaching part having the surface support 43 and side support 45 function together as a supporting beam.

Along a gap 45a, the side support 45 is separated into a front side support 45b1 and a rear side support 45b2. The rear side support 45b2 and the front side support 45b1 are joined to the piezoelectric element 23 through the nonconductive adhesive layer 47. This configuration and the flexible links 18d and 18e cooperate to greatly improve rigidity around the piezoelectric element 23.

The present invention is not limited to the above-mentioned embodiments. The embodiments are modifiable without departing from the teachings and technical ideas stipulated in the claims and specification. Head suspensions and methods of manufacturing head suspensions based on such modifications also fall in the scope of the present invention.

The embodiments have been explained on an assumption that the head suspension of each embodiment is arranged to face a magnetic disk from above. In practice, the head suspension is also arranged to face a magnetic disk from below. The present invention is also applicable to such a case by properly interpreting positional relationships mentioned in the embodiments.

What is claimed is:

1. A head suspension having a conductive base plate, a piezoelectric element, and a load beam, the piezoelectric element deforming in response to a voltage applied thereto and thereby moving the load beam relative to the base plate in a sway direction, the head suspension comprising:
   an actuator base integral with the base plate;
   an auxiliary plate being a discrete part from the base plate and having a surface support and a side support, the surface support facing a periphery of a surface of the piezoelectric element, the side support facing in the sway direction a side face of the piezoelectric element;
   an attaching part electrically connected to the base plate and formed of the actuator base and auxiliary plate, the attaching part being present between the base plate and the load beam and being configured to attach the piezoelectric element thereto;
   a nonconductive adhesive layer interposed between the attaching part and the piezoelectric element, to adhere the piezoelectric element to the attaching part; and
   a conductive material configured to electrically connect an electrode plane of the piezoelectric element and the side support to each other.

2. The head suspension of claim 1, wherein the attaching part is configured to surround a circumferential part of the piezoelectric element, the nonconductive adhesive layer is interposed between the attaching part and the circumferential part of the piezoelectric element, to surround the circumferential part of the piezoelectric element, and the conductive material extends across the nonconductive adhesive layer and electrically connects the electrode plane of the piezoelectric element and the side support to each other.

3. The head suspension of claim 1, further comprising:

a displacement allowing part formed in the surface support and side support and configured to allow the movement of the load beam according to the deformation of the piezoelectric element.

4. The head suspension of claim 1, wherein a pair of the attaching parts are arranged side by side in the sway direction, and the piezoelectric element is attached to each of the attaching parts.

5. The head suspension of claim 1, further comprising:

a pair of flexible links outwardly protruding from sides of the attaching part.

6. The head suspension of claim 1, wherein the side support has a connection face configured to receive the conductive material, the connection face being flush with the electrode plane of the piezoelectric element.

7. The head suspension of claim 1, wherein the side support has a surface covered with a conductive metal layer.

8. The head suspension of claim 1, wherein the side support has a receptacle configured to receive the conductive material.

9. A method of manufacturing the head suspension of claim 1, comprising steps of:

forming the attaching part by providing a half-finished work member with the base plate and the load beam;

attaching the piezoelectric element to the attaching part with the nonconductive adhesive layer; and applying the conductive material.

10. A method of manufacturing the head suspension of claim 8, comprising steps of:

forming the attaching part by providing a half-finished work member with the base plate and the load beam, and at this time, partially etching a part serving as the side support to form the receptacle;

attaching the piezoelectric element to the attaching part with the nonconductive adhesive layer; and applying the conductive material.

\* \* \* \* \*